Jan. 15, 1957  J. B. DUTY  2,777,298
VEHICLE AIR CONDITIONER
Filed Aug. 11, 1953

INVENTOR
JOHN B. DUTY
BY A. Yates Dowell
ATTORNEY

United States Patent Office 2,777,298
Patented Jan. 15, 1957

2,777,298

VEHICLE AIR CONDITIONER

John B. Duty, Abernathy, Tex.

Application August 11, 1953, Serial No. 373,609

9 Claims. (Cl. 62—117)

This invention relates to refrigeration and more particularly to a system for transferring heat from the interior of a vehicle to the evaporation of a refrigeration system.

While the air conditioning of vehicles and particularly automobiles has been practiced heretofore, public acceptance of an automobile air conditioner has been on a small scale due to the expense involved as well as other factors.

One of the important design factors in the vehicle, especially the automobile, air conditioning system is the location of the heat dissipating and heat absorbing elements. In one type installation the condenser is located adjacent to the car radiator and the evaporator in the trunk at the rear of the car. This requires lengthy refrigerant lines which are subject to leakage and may be difficult to repair. Furthermore, the load on the system may be increased by excessive heat transfer to such lines. According to the present invention, the refrigeration system may be constructed as a unit, with the evaporator in close proximity thereto, and the effect of its cooling transmitted to a remotely located element for space cooling. The use of such heat interchanger permits the refrigeration system to be compactly located, obviating the use of excessively long refrigerant conduits, but at the same time permits installation of the air cooling element at the desired location.

Accordingly, it is an object of the present invention to provide a vehicle air conditioner including a heat exchanger for cooling fluid which is circulated through the space to be cooled.

A further object is the provision of a heat exchanger including an evaporator coil adapted to remove heat from a fluid circulated in contact therewith and in which all moving parts are easily accessible.

A further object is the provision of a heat exchanger unit including an impeller mounted therewithin for circulating fluid over a cooling coil within the unit and in which the impeller and its driving means are easily accessible for installation and removal.

A further object is to provide a heat exchanger for circulating fluid over an evaporator coil which is simple and inexpensive to construct, durable, and easy to service.

Figure 2:
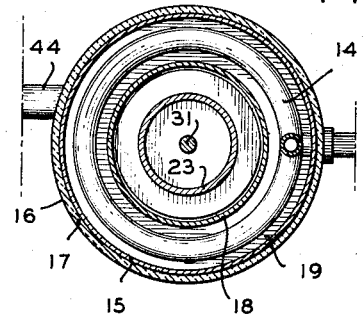
Figure 1:
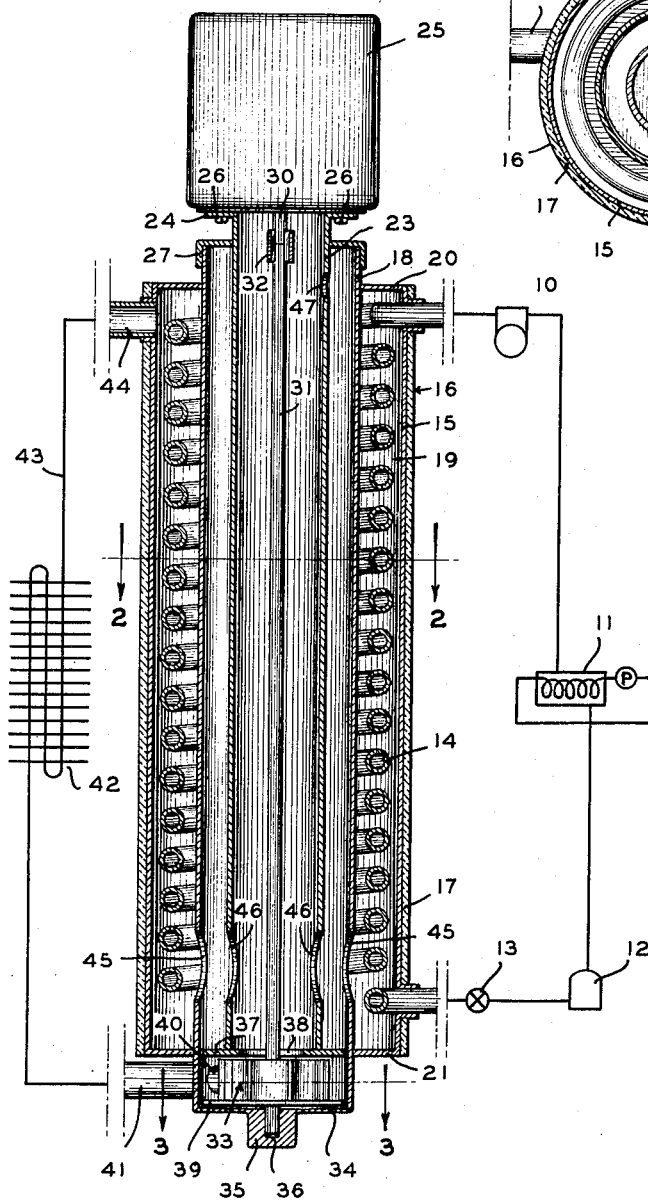

These and other objects of the invention will become apparent from the following description in conjunction with the accompanying drawing in which:

Fig. 1 is a vertical section through a heat exchanger constructed in accordance with the present invention, certain regrigeration elements being illustrated diagrammatically;

Fig. 2, a section on the line 2—2 of Fig. 1; and

Figure 3:
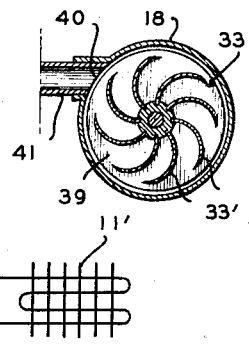

Fig. 3, a section on the line 3—3 of Fig. 1.

Referring to the drawing, the refrigeration system shown includes a compressor 10, condenser 11, receiver 12, and expansion valve 13 connected by suitable conduits to an evaporator coil 14. The condenser 11 may be of the liquid cooled type and have an air cooled remotely located heat dissipating element 11' if desired.

While a compression type system is illustrated, the invention is not limited to a system of this kind but includes others which are well known in the art.

The evaporator coil 14 is mounted within and forms a part of a heat exchanger 15. The heat exchanger has an outer wall 16 which is preferably cylindrical and provided with insulation 17. A second cylindrical wall 18 is mounted axially within the outer wall, the space 19 therebetween receiving the evaporator coil 14. Upper and lower enclosure members or collars 20 and 21 extend between the ends of the wall 16 and the side of the wall 18 in order to enclose the space 19.

Positioned axially within the cylindrical wall 18 and spaced therefrom is a tube 23 having a flanged collar 24 at its upper end on which a drive motor 25 is mounted by suitable fastening means 26. Spaced slightly below the motor the tube has an annular cap 27 fastened to it which fits over the upper end portion of the cylinder 18, the latter extending beyond the end member 20.

The motor 25 has a stub shaft 30 which is connected to a main drive shaft 31 by a coupling 32. At the lower end of the drive shaft 31 an impeller 33 is mounted within the cylinder 18. Closure member 34 at the lower end of cylinder 18 has a shaft guide portion or boss 35 with a bore 36 for receiving the lower end of the shaft 31, suitable bearing means being provided to reduce friction.

The tube 23 has a flange 37 at its lower end immediately above the upper portion of the impeller 33, and forming an upper wall for the impeller. The flange 37 extends inwardly of the tube and has an opening 38 through which the shaft 31 extends, the opening defining the intake to the impeller. The flange 37 extends outwardly from the tube in proximity to the inner surface of the cylinder 18 but spaced sufficiently therefrom that movement axially within the cylinder may be accomplished. The blades 33' of the impeller are attached to plate 39 and shaft 31.

Outlet 40 of the impeller discharges to a conduit 41 extending through the lower end portion of the wall of cylinder 18 to a radiator 42 or other heat transfer device positioned in, or communicating with, the space to be cooled. The radiator may, if desired, be used alternately for cooling in summer and heating in winter, suitable connections being provided. The radiator is attached by a line 43 to an inlet 44 in the upper end portion of the cylinder 16.

In order to permit flow of fluid within the space 19 to the intake 38 of the impeller the lower end portion of the cylinder 18 is provided with openings 45 opposite the lowermost coils of the evaporator 14. Openings 46 are provided in the lower portion of the tube 23 laterally opposite the openings 45 in the cylinder. Additionally, an air vent opening 47 is provided in the upper portion of tube 23.

In the operation of the device the refrigerating elements supply refrigerant to the coil 14 for cooling the same. Motor 25 drives impeller 33 to circulate fluid from space 19 where it is chilled through the openings 45 and 46 into the impeller and discharges it into line 41 for flow to the cooling element 42. From the cooling element the fluid returns to space 19 through the connection 44 at the upper portion thereof.

The moving parts of the heat exchanger, namely, the motor, the drive shaft and the impeller, are mounted by the cap 27 on the upper end of the cylinder 18 and may be withdrawn as required for servicing or replacement. Various fluids such as water, alcohol, or anti-freeze solution may be circulated through the cooling element.

While a particular system has been illustrated and described, it will be understood by those skilled in the art that the invention is not limited to the illustrated embodiment but that reasonable variations therefrom are within

What is claimed is:

1. A refrigeration system comprising connected refrigerant translating, condensing, expanding, and evaporating elements, said evaporating element comprising a vertical coil, a first cylinder surrounding said coil, a second cylinder mounted axially within said coil, said cylinders extending beyond the ends of said coil, means enclosing the space between said cylinders, a tube extending axially of and within the inner cylinder, means for supporting said tube on the upper end of the inner cylinder, a motor mounted on the upper end of said tube, a stub shaft extending downwardly from said motor, a drive shaft extending downwardly within said tube, means coupling said stub and said drive shafts, an impeller mounted on said drive shaft and beyond the lower end of said tube, flange means extending from the lower end of said tube in proximity to said inner cylinder and spaced therefrom, said flange means extending laterally inwardly of said tube and defining an opening, said drive shaft extending through said opening, said opening defining the intake to said impeller, enclosure means for the lower end of said inner cylinder, said enclosure means having bearing guide means for said shaft, discharge means for said impeller extending through the lower end of said inner cylinder and beyond said outer cylinder, the lower portions of said inner cylinder and said tube being provided with openings for the passage of fluid from the space between the inner and outer cylinders to the impeller, conduit means extending from the discharge means of the impeller to heat transfer means for the space to be cooled, and means connecting the heat transfer means to the upper portion of the space between the inner and outer cylinders.

2. A refrigeration system comprising connected refrigerant translating, condensing, expanding, and evaporating elements, said evaporating element comprising a vertical coil, a first cylinder surrounding said coil, a second cylinder mounted axially within said coil, means enclosing the space between said cylinders, a tube extending axially of and within the inner cylinder, means for removably supporting said tube within said inner cylinder, a motor mounted on the upper end of said tube, drive means extending from said motor downwardly within said tube, an impeller mounted on said drive means and beyond the lower end of said tube, flange means extending from the lower end of said tube in proximity to said inner cylinder, enclosure means for the lower end of said inner cylinder, said enclosure means having bearing guide means for said drive means, discharge means for said impeller, the lower portions of said inner cylinder and said tube within said outer cylinder being provided with openings for the passage of fluid from the space between the inner and outer cylinders to the central portion of the impeller, conduit means extending from the discharge means of the impeller to heat transfer means for the space to be cooled, and means connecting the heat transfer means to the upper portion of the space between the inner and outer cylinders.

3. The structure of claim 2, the condensing element comprising primary conduit means for refrigerant, secondary conduit means circulating a heat transfer fluid in heat exchange relation with said primary conduit means, said secondary conduit means having remotely disposed heat dissipating means.

4. A heat transfer device comprising a vertical coil, a first cylinder surrounding said coil, a second cylinder mounted axially within said coil, means enclosing the space between said cylinders, a tube removably supported axially of and within the inner cylinder, rotary driving means mounted at the upper end of said tube, drive means extending from said driving means downwardly within said tube, an impeller mounted on said drive means and beyond the lower end of said tube, flange means extending from the lower end of said tube in proximity to said inner cylinder, enclosure means for the lower end of said inner cylinder, said enclosure means having bearing guide means for said drive means, discharge means for said impeller, the lower portions of said inner cylinder and said tube within said outer cylinder being provided with openings for the passage of fluid from the space between the inner and outer cylinders to the impeller, conduit means extending from the discharge means of the impeller to heat transfer means for the space to be cooled, and means connecting the heat transfer means to the upper portion of the space between the inner and outer cylinders.

5. An evaporator comprising conduit means formed about a vertical axis and of substantial height, a first wall surrounding said conduit means, a second wall spaced from said first wall and positioned internally of said conduit means, said first and second walls having a space therebetween in which said conduit means is positioned, closure means between the walls at each end of the conduit means and enclosing said conduit means, tube means mounted internally of and spaced from the second wall, driving means mounted on the upper end of said tube means, drive means extending from said driving means through the tube means, impeller means mounted on the lower end of said drive means and just beyond said tube means, flange means on the lower end of said tube means and extending in proximity to said second wall, said impeller means being positioned in the lower end portion of said second wall, closure means capping the lower end of said second wall, guide means for said impeller means in said capping closure means, inlet means for the space between said walls at the upper portion thereof, said second wall and said tube having passages at the lower portions thereof and within said first wall and permitting fluid to pass from said space to the central portion of the impeller means, and outlet means for the impeller means.

6. An evaporator comprising conduit means formed about a vertical axis and of substantial height, a first wall surrounding said conduit means, a second wall spaced from said first wall and positioned internally of said conduit means, said first and second walls having a space therebetween in which said conduit means is positioned, closure means between the walls at each end of the conduit means and enclosing said conduit means, tube means mounted internally of and spaced from the second wall, driving means mounted on the upper end of said tube means, drive means extending from said driving means through the tube means, impeller means mounted on the lower end of said drive means and just beyond said tube means, flange means on the lower end of said tube means and extending in proximity to said second wall, said impeller means being positioned in the lower end portion of said second wall, closure means capping the lower end of said second wall, inlet means for the space between said walls at the upper portion thereof, said second wall and said tube having passages at the lower portions thereof and within said first wall and permitting fluid to pass from said space to the central portion of the impeller means, and outlet means for the impeller means.

7. An evaporator comprising conduit means formed about a vertical axis and of substantial height, a first wall surrounding said conduit means, a second wall spaced from said first wall and positioned internally of said conduit means, said first and second walls having a space therebetween in which said conduit means is positioned, closure means between the walls at each end of the conduit means and enclosing said conduit means, tube means mounted internally of and spaced from the second wall, driving means mounted on the upper end of said tube means, drive means extending from said driving means through the tube means, pump means driven from the lower end of said drive means and just beyond said tube means, flange means on the lower end of said tube means and extending in proximity to said second wall, said pump means being positioned in the lower end portion of said second wall, inlet means for the space between said walls at the upper portion thereof, said second wall and said tube having passages at the lower portions thereof and within said first wall and permitting fluid to pass from said space to the control portion of the pump means, and outlet means for the pump means.

8. For use with an air conditioning system in which fluid coolant flows through conduit means in heat exchange relation with the air to be conditioned, means for removing heat from said coolant prior to its passage through said conduit means, said heat removing means comprising an enclosed cylinder, an evaporator coil positioned within the cylinder adjacent to the walls thereof and leaving unobstructed throughout the length of the evaporator a cylindrical space of substantial radius, a first tube mounted within the cylinder and having its side walls adjacent to the evaporator, said evaporator being contained in the space between said cylinder and said first tube, a second tube within said first tube, a pump at one end of said second tube, a drive shaft for said pump extending through said second tube, drive means for said drive shaft at the other end of said second tube, said first and second tubes having openings through the walls thereof adjacent to the pump end, said second tube having passage means for fluid flowing through said openings to enter the inlet of said pump, a housing around said pump and having an outlet for the discharge of fluid therefrom, said cylinder having an inlet at its end remote from the openings in the first and second tubes into the space between its side wall and the first tube.

9. In an air conditioning system, heat removing means comprising a housing having spaced inner and outer walls defining an upstanding chamber and an upstanding unobstructed central chamber, a closure for the lower end of said chamber, a cooling coil located within said chamber, a tube within the central chamber, a drive shaft located in the tube in said central chamber, a fluid circulating impeller on the lower end of said shaft, and motor means connected to the upper end of said shaft in a manner to drive said shaft and said impeller, said drive shaft impeller and motor means being free to be removed as a unit by a lifting force sufficient to overcome gravity, said housing having an inlet for directing fluid into contact with said cooling coil and having an outlet for removing fluid after contacting said cooling coil whereby said fluid may be conducted to and from a radiator.

References Cited in the file of this patent
UNITED STATES PATENTS

| | | |
|---|---|---|
| 2,009,312 | Fugle | July 23, 1935 |
| 2,222,989 | Robb | Nov. 26, 1940 |
| 2,292,335 | Durbin | Aug. 4, 1942 |
| 2,470,551 | Fish | May 17, 1949 |
| 2,546,417 | Anglin | Mar. 27, 1951 |